United States Patent Office 3,290,276
Patented Dec. 6, 1966

3,290,276
OIL-SOLUBLE PHOSPHO-HALO-CONTAINING ETHYLENE/PROPYLENE COPOLYMERS
William S. Anderson, Oakland, Calif., assignor to Shell Oil Company, a corporation of Delaware
No Drawing. Original application Dec. 21, 1959, Ser. No. 860,716, now Patent No. 3,105,819. Divided and this application May 3, 1963, Ser. No. 277,705
3 Claims. (Cl. 260—88.2)

This patent application is a division of copending case, Serial No. 860,716, filed December 21, 1959, and is now U.S. Patent 3,105,819.

This invention relates to a new and novel class of polymers. More particularly the invention is directed to multifunctional polymers containing a plurality of phosphorus units attached to a long hydrocarbon back bone chain.

In the field of lubrication non-ash forming polymeric detergent extreme pressure additives are particularly desirable although copolymers of this invention have many other applications as will be shown hereinbelow.

It has been discovered that polymers which meet this requirement are oil-soluble copolymers of the present invention which are polyphosphonated copolymers of ethylene and a lower monoalkyl ethylene such as copolymers of ethylene and propylene or ethylene and butene-1 or mixtures thereof. In copolymers of this invention the ethylene precurser comprises at least 20% of the total mixture at least 10% and preferably 15-40% of the phosphonated copolymer product. The phosphonated copolymer has a plurality of units represented by:

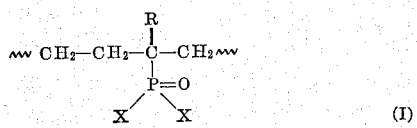

(I)

and also if desired

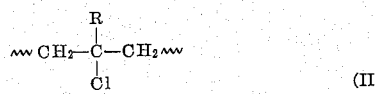

(II)

units, normally if present vary from about 2% to about 15% of units (I). Copolymers of this invention range in molecular weight from about 5,000 to about 1,000,000, preferably between about 100,000 and about 500,000. The symbols in the above formulas are: R is a $C_{1-4}$ alkyl radical, preferably a —$CH_3$ radical, the X's can be —YR' and where Y is oxygen or sulfur and R' is a hydrocarbyl radical, such as $C_{1-20}$ preferably $C_{4-18}$ alkyl, cycloalkyl, aralkyl radical or a cation such as amine, e.g. $C_{1-18}$ alkyl amine, polyamine, e.g. an alkylene diamine, a heterocyclic amine, e.g. alkyl substituted pyridine, etc.

The phosphonated copolymers of the present invention are prepared by reacting ethylene and a lower monoalkyl ethylene such as propylene, butene-1 and the like to form copolymers such as ethylene/propylene copolymer made by the procedures and techniques described in Irish patent application 695/56 and treating said copolymer with phosphorus chloride under oxidizing conditions, such as by blowing air or oxygen through the reaction mixture under controlled temperature conditions. In essence the intermediate product, that is the elastomeric copolymer, is produced by polymerizing a mixture of ethylene and propylene in the presence of an inert hydrocarbon solvent with a catalyst of the Ziegler type which essentially is a reaction product of a metallo-alkyl compound of Groups I, II or III and a metal halide such as vanadium chloride or vanadium oxychloride. The ratio of ethylene and propylene monomers that is maintained during the polymerization will vary depending on the proportion of the respective monomers desired in the final elastomer. In the preferred embodiments the elastomer may contain from about 20 mole percent of about 90 mole percent, preferably 30–80 mole percent of ethylene units in the copolymer and still be useful in the formation of the elastomer. Because the monomers do not polymerize at the same rate, i.e. ethylene polymerizes faster than propylene, the ratio of the starting mixture of monomer is not the same as that desired in the final product and this is one of the major considerations in selecting the starting monomer ratios to give a particular final product. Other considerations are the choice of catalyst components and their respective proportions and the polymerization conditions. By way of illustration, Table I indicates variations of ethylene units in the final elastomer as the ratio of ethylene to propylene in the starting monomer mixture is varied. For this table, polymerizations were conducted at 45–65° C. in n-heptane solvent and the catalyst was the reaction product of trihexyl-aluminum and vandium oxychloride in a mole ratio of 3.0:1.

Table I

| Mole percent Ethylene in Feed Gases | Mole percent Ethylene in in Copolymer |
|---|---|
| 8.0 | 24.0 |
| 18.0 | 48.1 |
| 26.0 | 57.7 |
| 32.0 | 62.4 |
| 50.0 | 80.3 |

Other suitable alkyl aluminum compounds as the catalyst component include trioctyl aluminum, trinonyl aluminum, tridecyl aluminum, triisobutyl aluminum, and others. Preferably the alkyl radicals of the trialkyl aluminum have more than 4 carbon atoms but not more than 16 carbon atoms. For economic reasons, the number of carbon atoms in the alkyl radicals preferably range from 4 to 10. The ratio of the aluminum compounds to the vanadium oxychloride or vanadium tetrachloride may vary widely but preferably the aluminum to vanadium mole ratio is greater than 2. The catalyst is simply prepared by mixing and reacting the catalyst components in a hydrocarbon solvent whereupon there is formed a reaction product which is the catalyst.

The final phosphorus-containing polymeric product of this invention is obtained by reacting an elastomeric ethylene-propylene copolymer of the type described above with phosphorus trichloride, phosphorus oxychloride, phosphorus tribromide, etc. in an inert solvent under oxidizing conditions, such as by blowing air or oxygen through the mixture at controlled temperatures of from about 0° to 60° C., preferably at 10–35° C. The resulting polyphosphonyl halide-containing copolymer can be hydrolyzed to form the polyphosphonic acid and the acid esterified or converted into salts by suitable means. The time required for completing the reaction depends upon the number of units (I) which are desired to be provided in the copolymer as well as the ratio of the reactants and the reaction temperature. In general, the time required to complete the reaction may vary from 2 to 48 hours or more.

The following examples are given as illustrative of the present invention.

EXAMPLE I

To a mixture of 222 grams of Ziegler type copolymer of 50% ethylene and 50% propylene having an intrinsic viscosity of 5.5 dl./g. in 2.8 liters of benzene was added dropwise 365 grams of $PCl_3$ over a period of 3 hours while simultaneously bubbling oxygen through the mixture and controlling the temperature of the reaction at 12–34° C. by ice cooling the reaction vessel. About 550 ml. of methanol was then slowly added, and the resulting HCl swept out with nitrogen. To the product about 1 gram of a phenolic anti-oxidant [2,2′-methylene bis(4-methyl-6-tert.butylphenol)] was added as well as 625 ml. of pyridine and the entire mixture was cooled and allowed to stand for 48 hours. The pyridine salts were filtered off and the polymer precipitated by adding methanol and then reprecipitated three times from benzene into methanol. On analysis the resulting mixed methyl phosphonate-phosphonyl chloride containing ethylene/propylene copolymer contained 2.41% phosphorus and 0.983% chloride corresponding to 14% of the ethylene/propylene copolymer units containing the phosphono group.

Following the above procedure, the following phosphono-modified elastomeric copolymers of ethylene/propylene having an intrinsic viscosity in the range of 1 to 10 dl./g. were prepared:

II. Poly(dibutylphosphonate) of ethylene/propylene copolymer having intrinsic viscosity of 2 dl./g.
III. Poly(dihexylphosphonate) of ethylene/propylene copolymer having intrinsic viscosity of 3–4 dl./g.
IV. Poly(dilaurylphosphonate) of ethylene/propylene copolymer having intrinsic viscosity of 5 dl./g.
V. Poly(stearyl acid phosphonate) of ethylene/propylene copolymer having intrinsic viscosity of 2 dl./g.
VI. Poly(dicyclohexyl phosphonate-phosphonylchloride) ethylene/butene-1 copolymer having an intrinsic viscosity of 4–6 dl./g.

The polymeric compounds of this invention are effective oil additives imparting to lubricants detergency and wear inhibiting properties. Also, they may be used as ion exchange resins, fire-resistent materials, adhesives, coatings, as insecticidal materials, alone or in conjunction with other well known insecticidal agents such as DDT, DDD, aldrin, parathion, Chlorothion and the like. However, polymers of the present invention are outstanding for their ability to impart to mineral oil (1) detergency as determined by the Carbon Black Dispersency Test described in the Journal of Colloid Science, vol. 12, October 1957, No. 5, pages 500–522; at 100° C. and 5 r.p.m. and (2) anti-wear properties using Oldsmobile Tappet Wear Test Ring under GM–MS Test conditions (2500 r.p.m., 300 number valve open spring load described in the AMA proposed specification for evaluation of oils for API Service classification MS presented at SAE meeting, Atlantic City, New Jersey, June 1958). The results are shown in Table II and the compositions tested were as follows:

Composition A:
    Example I additive _____ 2. Percent
    1010 neutral mineral oil _____ Essentially balance.
Composition B:
    Example II additive _____ 2.
    1010 neutral mineral oil _____ Essentially balance.
Composition C:
    Example III additive _____ 2.
    1010 mineral oil _____ Essentially balance.
Composition D:
    Example IV additive _____ 5.
    Mineral oil (SAE 30) _____ Essentially balance.
Composition E:
    Example V additive _____ 1.
    1010 mineral oil _____ Essentially balance.
Composition F:
    Example I additive _____ 3.
    SAE 90 mineral oil _____ Essentially balance.
Composition G:
    Example I additive _____ 2.
    Di-2-ethyl hexyl sebacate _____ Essentially balance.
Composition H:
    Example I additive _____ 5.
    Ucon 50HB660 (polyethylenepropylene glycol having a SUS viscosity at 100° F. of 660) _____ Essentially balance.
Composition I:
    Example I additive _____ 5.
    Di-2-ethylhexyl sebacate _____ Essentially balance.

*Table II*

| Composition | Detergency (deflocculating ability) | GM-MS Test | |
|---|---|---|---|
| | | Av. lifter [a] visual rating | Av. Cam wear, thousands of inch |
| (1) 100 Neutral mineral oil | $3 \times 10^3$ ohms | 5 | 44 |
| (2) (1) + 2% Ca petroleum sulfonate. | $3.3 \times 10^3$ ohms | 5 | 44 |
| (3) (1) + 2% $C_{8-18}$ alkyl methacrylate copolymer. | $3 \times 10^3$ ohms | 5 | 44 |
| (4) Compositions A–I (present invention). | $12 \times 10^3$ ohms | 9 | 0 |

[a] 10=perfect.

From the test results the superiority of compositions of the present invention to oils containing convention detergents (2) or polymers (3) with respect to detergency, cleanliness and wear inhibition is clearly evidenced. Thus, representative compositions of the present invention (4) is about 4 times as effective as a detergent as are compositions (2) and (3) or a neat oil (1), twice as effective in preventing sludge and many more times effective as a wear inhibitor than that of compositions (1), (2) or (3).

The polymers of this invention are useful also for providing superior load-carrying properties in lubricating oils which contain minor amounts of other agents which are non-reactive with the polymer, such as silicone anti-foaming agents, alkylphenol anti-oxidants, polyacrylate ester viscosity-index improvers, and the like.

I claim as my invention:

1. An oil-soluble polyphosphonate of ethylene/propylene copolymer, the phosphonate units in the copolymer being represented by

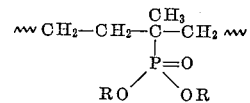

where R is an alkyl selected from the group consisting of lauryl and stearyl radicals and the number of such units comprise from 10% to 40% of the ethylene/propylene copolymer, said copolymer having a molecular weight of from 5000 to 1,000,000.

2. The copolymer of claim 1 wherein R is lauryl and the mole percent of ethylene is 30–80 mole percent and the balance is propylene.

3. The copolymer of claim 1 wherein R is stearyl and the mole percent of ethylene is 30–80 mole percent and the balance is propylene.

References Cited by the Examiner

UNITED STATES PATENTS 3,008,939  11/1961  Schroeder et al. ____ 260—94.9
3,023,180  2/1962  Canterino et al. ____ 260—94.9

JOSEPH L. SCHOFER, *Primary Examiner.*

L. E. DELMAN, *Assistant Examiner.*